United States Patent

[11] 3,588,152

| [72] | Inventor | Robert D. Shomo<br>Taylor, Mich. |
|---|---|---|
| [21] | Appl. No. | 853,797 |
| [22] | Filed | Aug. 28, 1969 |
| [45] | Patented | June 28, 1971 |
| [73] | Assignee | Develco Corporation<br>Taylor, Mich. |

[54] VERSATILE STAMPED SHAFT COLLAR
3 Claims, 9 Drawing Figs.

[52] U.S. Cl. .................................................. 287/52.03
[51] Int. Cl. ....................................................... B60b 27/06
[50] Field of Search ........................................ 287/52.03,
52, 52.07, 53

[56] References Cited
UNITED STATES PATENTS

| 297,339 | 4/1884 | Baldwin et al. | 287/52.03X |
| 403,902 | 5/1889 | Bailey | 287/52.03X |
| 454,227 | 6/1891 | Reitz | 287/52.03X |
| 2,421,115 | 5/1947 | Carlson | 287/52.07X |
| 2,858,152 | 10/1958 | Rifner | 287/52.07 |

FOREIGN PATENTS

| 1,046,938 | 10/1966 | Great Britain | 287/52 |
| 254,877 | 9/1926 | Great Britain | 287/52 |

*Primary Examiner*—Reinaldo P. Machado
*Assistant Examiner*—Andrew V. Kundrat
*Attorney*—Donnelly, Mentag & Harrington

ABSTRACT: A split stop collar for use on shafts and other products. The stop collar includes two symmetrical half sections. Each half section comprises two substantially arcuate sidewall plates connected at their outer ends by lug plates. The four sidewall plates provide eight points of gripping contact with a shaft. The lug plates on the two half sections are fastened together by allen-head screws and nuts to clamp the stop collar on a shaft.

PATENTED JUN28 1971 3,588,152
SHEET 1 OF 2
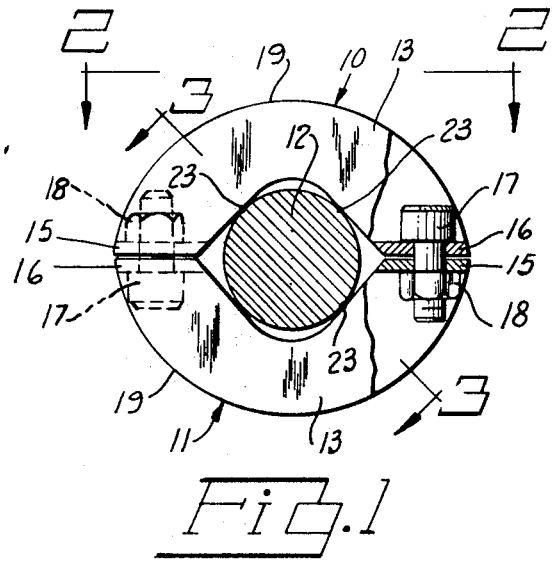
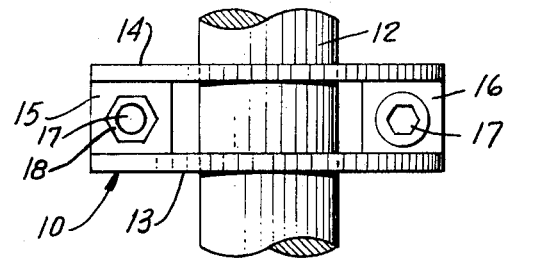
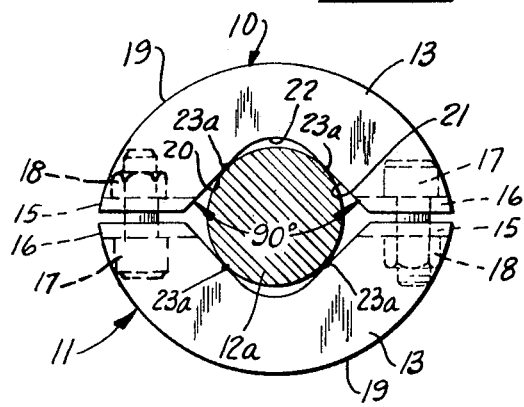
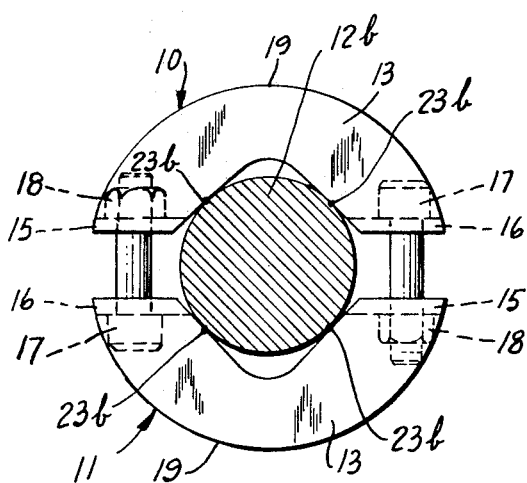
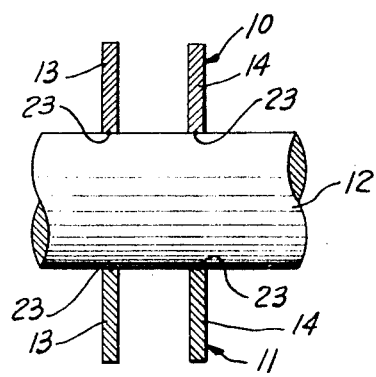
INVENTOR.
ROBERT D. SHOMO
BY Donnelly, Mentag & Harrington
ATTORNEYS

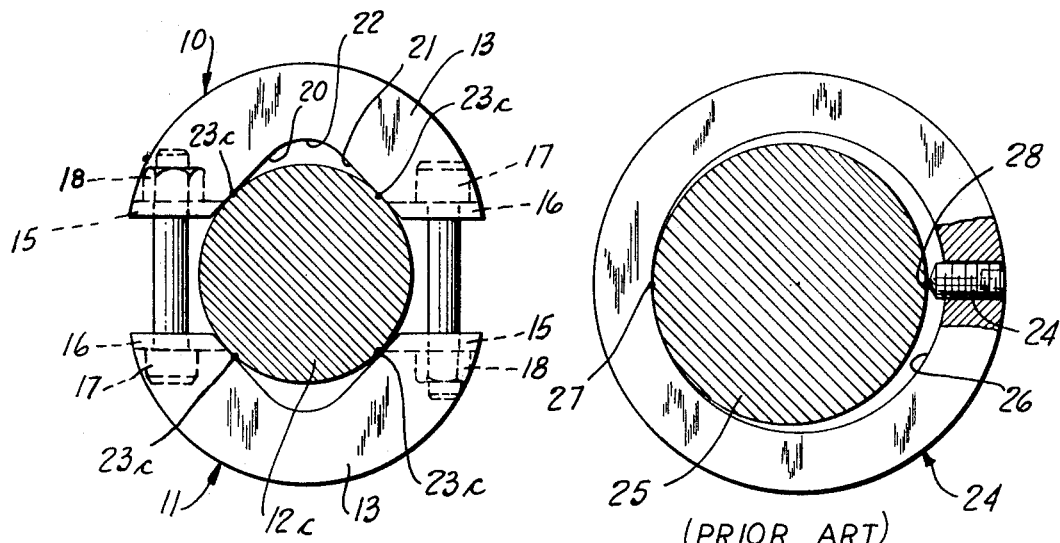
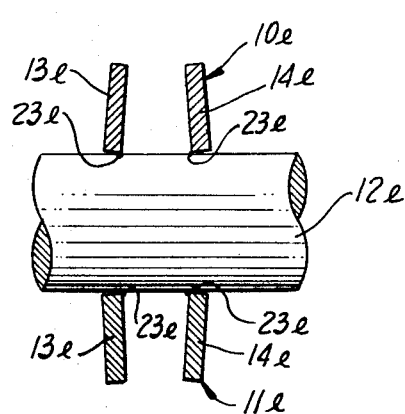
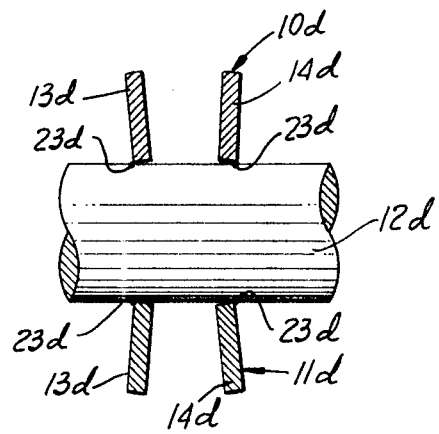
INVENTOR.
ROBERT D. SHOMO

3,588,152

VERSATILE STAMPED SHAFT COLLAR

SUMMARY OF THE INVENTION

This invention relates generally to shaft stop collars and more particularly to a novel and improved split-type stop collar which comprises two symmetrical collar half sections.

Stop collars have been provided heretofore, but the prior art stop collars have many disadvantages. For example, the prior art stop collars are made in standard sizes or increments, and they will not fit a nonstandard size shaft, and, accordingly, a large inventory of such collars must be maintained. The prior art integral stop collar has a disadvantage in that it contacts a shaft on only one side thereof at a point opposite the stop collar fastening setscrew, whereby an unbalanced condition is created. A further disadvantage of the prior art integral stop collar is that the setscrew used to fasten such stop collar in place forms scores or marks on the surface of the shaft. The prior art stop collars are also machined collars and are expensive to make. The integral-type prior art collars also require a disassembly of the shaft and the other parts carried thereon so that the stop collar can be mounted over the shaft. The fact that the prior art collars have a minimum number of contact points with a shaft also creates problems of slippage of the stop collar on a shaft, and the axial thrust or load which such a collar can take is limited.

In view of the foregoing it is an important object of the present invention to provide a novel and improved stop collar which overcomes the aforementioned disadvantages of the prior art stop collars.

It is another object of the present invention to provide a novel and improved stamped steel split stop collar which will fit a number of various sizes of shafts, including nonstandard diameter shafts. The advantage of being able to fit a number of sizes of shafts permits the user of the stop collar of the present invention to reduce the number of stop collars needed to be maintained in stock as compared to the prior art standard stop collars which requires a large number of stop collars to provide a separate collar for each standard size shaft.

It is still another object of the present invention to provide a novel and improved stop collar which is simple and compact in construction, economical to manufacture and efficient in operation. The stop collar of the present invention comprises two symmetrical steel stampings, and no costly machining is required in the manufacture of the collar.

It is a further object of the present invention to provide a novel and improved stop collar which is adapted to withstand high axial thrust loads without scoring the shaft on which it is mounted, and which is adapted to contact the shaft at eight different points to provide the ability to withstand high thrust loads.

It is still a further object of the present invention to provide a novel and improved stop collar which is light in weight, which can be mounted on a shaft without disassembling the shaft, and which is balanced when mounted on a shaft.

It is still another object of the present invention to provide a novel and improved shaft split stop collar that includes a pair of symmetrical collar half sections, each of said half collar sections including a pair of spaced-apart sidewall plates which are substantially arcuate in shape and which are adapted to contact a shaft at two points, the pair of sidewalls in each collar half section being connected by a pair of lug plates, and means for securing the lug plates together to clamp the two collar half sections on a shaft.

Other objects, features and advantages of this invention will be apparent from the following detailed description, appended claims, and the accompanying drawings.

BRIEF DESCRIPTION OF THE DRAWINGS

FIG. 1 is a side elevational view of a shaft split stop collar made in accordance with the principles of the present invention.

FIG. 2 is a top plan view of the structure illustrated in FIG. 1, taken along the line 2-2 thereof, and looking in the direction of the arrows.

FIG. 3 is an elevational section view of the structure illustrated in FIG. 1, taken along the line 3-3 thereof, and looking in the direction of the arrows.

FIG. 4 is a side elevational view, similar to FIG. 1, and showing the stop collar of FIG. 1 mounted on a second size shaft.

FIG. 5 is a side elevational view, similar to FIG. 1, and showing the stop collar of FIG. 1, mounted on a third size shaft.

FIG. 6 is a side elevational view, similar to FIG. 1, and showing the stop collar of FIG. 1 mounted on a fourth size shaft.

FIG. 7 is an elevational view of a conventional-type stop collar.

FIG. 8 is an elevational section view, similar to FIG. 3, and showing a modified stop collar made in accordance with the principles of the present invention and having diverging sidewalls.

FIG. 9 is an elevational section view similar to FIG. 3, and showing a modified stop collar made in accordance with the principles of the present invention and having converging sidewalls.

DESCRIPTION OF THE PREFERRED EMBODIMENTS

Referring now to the drawings, and in particular to FIG. 1, wherein is shown an illustrative embodiment of the invention, the numerals 10 and 11 generally designate two symmetrical stamped collar half sections which form the illustrated collar. The stop collar is of the split type and it is illustrated in FIGS. 1, 2 and 3 as being mounted on a first size or small size shaft 12. As shown in FIG. 2, the stop collar half section 10 comprises a pair of parallel, spaced-apart sidewall plates 13 and 14 which are interconnected at their outer ends by a pair of transverse lug plates 15 and 16. The lug plates 15 and 16 are disposed perpendicular to the parallel sidewall plates 13 and 14 and are integral therewith. The sidewall plates 13 and 14 and the lug plates 15 and 16 are formed as a unitary structure by any suitable stamping operation. Any suitable metal may be used in the making of the stop collar of the present invention. As shown in FIGS. 1 and 2, the two symmetrical stop collar half sections 10 and 11 are detachably secured together by a pair of allen-head screws 17 which pass through suitable holes formed through the lug plates 15 and 16. The screws 17 carry suitable locknuts 18.

As best seen in FIG. 1, the outer periphery of the sidewall plates 13 and 14 is semicircular in configuration, as indicated by the numeral 19. An axial recess is formed on the inner periphery of the sidewall plates 13 and 14. The last-mentioned recess is substantially V-shaped in configuration and includes the two 45° straight wall surfaces 20 and 21, which engage the shaft 12, and the radius 22 which is formed at the inner end of the straight surfaces 20 and 21. As indicated in FIG. 1, the shaft contacting straight surfaces 20 and 21 are spaced apart an arcuate distance of 90°. The numeral 23 in FIG. 1 designates the two points of contact of each of the sidewall plates 13 on the shaft 12. It will be understood that the four parallel sidewall plates of the two collar half sections 10 and 11 contact the shaft 12 at eight different contact points 23 to provide a firm clamping engagement with the shaft 12 to prevent slippage with resultant scoring of the surface of the shaft 12. The positive, eight-point clamping engagement with the shaft 12 also provides a stop collar which has the capability of absorbing an increased axial load as compared to the prior art type, one-piece stop collars illustrated in FIG. 7.

As shown in FIG. 7, the prior art one-piece stop collar 24 is shown mounted on a shaft 25. The stop collar 24 is a machined collar having an internal bore 26 in which is received the shaft 25. Collar 24 is costly, since it involves machining operations. It will be seen from an inspection of FIG. 7 that only a two-point engagement is provided between the shaft 25 and the collar 24, as indicated by the numerals 27 and 28. The shaft 25 engages the collar 24 at the point 27, and a setscrew 29 engages the shaft 25 at the point 28. Experience has shown that the stop collars 24 are subject to slippage and scoring of the shaft 25 because of the minimum number of clamp points between the collar 24 and the shaft 25. It will also be seen that the prior art collar 24 is not balanced around the axis of the shaft 25, and this produces an unbalanced condition on the shaft 25 when it is rotated with the stop collar 24 thereon.

FIGS. 4, 5 and 6 illustrate the stop collar of FIG. 1 mounted on three shafts which are larger in diameter than the shaft 12 of FIG. 1. The three larger shafts have been marked with the numerals 12a, 12b and 12c. It will be seen that the contact points 23a, 23b and 23c are at shifted positions outwardly along the angled, straight shaft engaging surfaces 20 and 21 as the shaft size is increased. It will be seen that a split stop collar made in accordance with the principles of the present invention can be used on a number of different size shafts, whereby the user can reduce the number of stop collars needed to be retained on hand as compared to the stop collar 24 of FIG. 7 which is limited to certain standard size shafts. FIGS. 1, 4, 5 and 6 illustrate the stop collar of the present invention being mounted on four shafts of different diameters, but it will be understood that the number of different shafts which the stop collar can be used on depends on the diameter of the shafts and the length of the collar straight surfaces 20 and 21.

FIG. 8 illustrates a modified split stop collar made in accordance with the principles of the present invention wherein the sidewall plates are formed so as to diverge radially outward relative to each other. The parts of the stop collar of FIG. 8 which are similar to the first embodiment of FIGS. 1 through 3 have been marked with the same reference numerals followed by the small letter d. It will be seen that the contact points 23d in FIG. 8 are first made by the outer edges of the sideplates 13d and 14d, and that when the bolts and nuts 15 and 16 are tightened in place, the sidewall plates are pivoted slightly inward toward each other so as to provide increased gripping pressure on the shaft 12d.

FIG. 9 illustrates a second modified stop collar made in accordance with the principles of the present invention. In the embodiment of FIG. 9, the sidewall plates have been formed so as to converge radially outward relative to each other. The parts of the embodiment of FIG. 9 which are the same as the first embodiment of FIGS. 1 through 3 have been marked with the same reference numerals followed by the small letter e. It will be seen that the contact points 23e in FIG. 9 are first made by the inner edges of the sidewall plates 13e and 14e, and that when the two half sections of the embodiment of FIG. 9 are tightened by their bolts 15 and nuts 16, they will be rotated outwardly relative to each other to provide a firm gripping engagement with the shaft 12e.

It will be understood that the sidewall plates of each collar half section of the embodiments of FIGS. 8 and 9 will diverge or converge from a parallel position by only a slight angle, as, for example, 1° or 2° from a parallel position. However, the maximum position of the parallel sidewall plates 13 and 14 is preferably held within a 5° divergence or convergence from the parallel position.

While it will be apparent that the preferred embodiments of the invention herein disclosed are well calculated to fulfill the objects above stated, it will be appreciated that the invention is susceptible to modification, variation and change.

I claim:
1. A shaft split stop collar comprising:
a. a pair of symmetrical collar half sections;
b. each of said half collar sections including a pair of spaced-apart sidewall plates which are substantially arcuate in shape;
c. the pair of sidewall plates in each collar half section being connected by a pair of lug plates;
d. means for securing the lug plates together to clamp the two collar half sections on a shaft; and,
e. the spaced-apart sidewall plates of each half collar section diverging radially outward relative to each other.
2. A shaft split stop collar as defined in claim 1, wherein:
a. each of said sidewall plates is provided with a substantially V-shaped recess on the inner side thereof for engaging a shaft at two points.
3. A shaft split stop collar comprising:
a. a pair of symmetrical collar half sections;
b. each of said half collar sections including a pair of spaced-apart sidewall plates which are substantially arcuate in shape;
c. the pair of sidewall plates in each collar half section being connected by a pair of lug plates;
d. means for securing the lug plates together to clamp the two collar half sections on a shaft; and,
e. the spaced-apart sidewall plates of each half collar section converging radially outward relative to each other.